(12) United States Patent
Grasheim et al.

(10) Patent No.: US 9,261,692 B2
(45) Date of Patent: Feb. 16, 2016

(54) M914 (AP/PVS-14 STYLE) IMPROVED DUAL CARRIAGE HEAD MOUNT AND DUAL BATTERY COMPARTMENT SYSTEMS

(76) Inventors: Walter Lee Grasheim, Trade, TN (US); Joaquin Raventos, Mountain City, TN (US)

( * ) Notice: Subject to any disclaimer, the term of this patent is extended or adjusted under 35 U.S.C. 154(b) by 1233 days.

(21) Appl. No.: 12/942,127

(22) Filed: Nov. 9, 2010

(65) Prior Publication Data
US 2012/0113503 A1    May 10, 2012

(51) Int. Cl.
*G03B 17/02* (2006.01)
*G02B 23/12* (2006.01)
*H01M 2/10* (2006.01)

(52) U.S. Cl.
CPC ........... *G02B 23/125* (2013.01); *H01M 2/1027* (2013.01); *H01M 2/1055* (2013.01); *Y10T 29/49002* (2015.01)

(58) Field of Classification Search
USPC ........................................................ 396/539
See application file for complete search history.

(56) References Cited

U.S. PATENT DOCUMENTS

| | | | |
|---|---|---|---|
| 5,703,354 A * | 12/1997 | Wannagot et al. | 250/214 VT |
| 5,872,831 A * | 2/1999 | Zoiss et al. | 379/21 |
| 6,014,009 A * | 1/2000 | Wierzbicki et al. | 320/107 |
| 7,576,516 B2 * | 8/2009 | Greenslade | 320/110 |
| 2002/0043956 A1 * | 4/2002 | Yamashita | 320/107 |
| 2002/0141756 A1 * | 10/2002 | Kaedeoka | 396/539 |
| 2004/0151963 A1 * | 8/2004 | Buchanan et al. | 429/34 |
| 2007/0003271 A1 * | 1/2007 | Ohsuga | 396/303 |
| 2008/0246434 A1 * | 10/2008 | Greenslade | 320/110 |
| 2009/0035608 A1 * | 2/2009 | Campesi et al. | 429/7 |
| 2009/0133178 A1 * | 5/2009 | Aguero et al. | 2/6.2 |

* cited by examiner

*Primary Examiner* — Clayton E Laballe
*Assistant Examiner* — Linda B Smith
(74) *Attorney, Agent, or Firm* — Patents on Demand P.A.; Brian K. Buchheit; Scott M. Garrett

(57) ABSTRACT

An enhanced battery compartment associated with a night vision monocular device (NVMD) can support multiple battery types. For each battery type, a NVMD can receive an input voltage from a power source within an interior chamber of the enhanced battery compartment. The power source can be a AA battery or a CR123A battery and no additional adapter is required when the enhanced battery compartment has been attached to the NVMD. The NVMD can conform to an Army Navy Personal Viewer System 14 (AN/PVS-14) device. The NVMD can regulate the input voltage from the power source and provide an output voltage conforming to a pre-determined setting. In one embodiment, regulation of the input voltage can be performed by a component external to the enhanced battery compartment and installed in the NVMD, such as a subsystem or subassembly of the NVMD. The NVMD can activate a monocular subassembly associated with the NVMD utilizing the output voltage. The monocular subassembly can present a view of an environment within a viewport.

20 Claims, 13 Drawing Sheets

M914 (AP/PVS-14 STYLE) IMPROVED DUAL CARRIAGE HEAD MOUNT AND DUAL BATTERY COMPARTMENT SYSTEMS

BACKGROUND

1. Field of the Invention

The disclosure relates to the field of electro-optic devices and, more particularly, enhanced battery compartment for a night vision monocular device permitting multiple battery type usage. Further, an embodiment of the invention details a dual carriage head mount.

2. Description of the Related Art

A night vision device (NVD) is a device comprising at least one infrared (IR) image intensifier tube in a rigid casing, commonly used by military forces, police, hunters, and the like. Military specifications for bidding on contracts can have a set of associated requirements which ensure that a night vision device functions in a known manner regardless of specific manufacture and regardless of ancillary features. One such standard is the Army/Navy Personal Viewer System 14 (AN/PVS-14) standard.

More specifically, the AN/PVS-14 Monocular Night Vision Device (MNVD) is in widespread use by US Armed Forces as well as NATO allies around the world. It uses a second or third generation image intensifier tube, and is currently manufactured by the Electro-Optical Division of L-3 Communications as well as the ITT Corporation, and OEM's such as Nightline, Inc. and other companies in the USA. It is often used "hands free" employing a head mount, face mask, harness, or attached to a combat helmet such as the Personnel Armor System for Ground Troops (PASGT), Advanced Combat Helmet, or Marine Lightweight Helmet. It can also be used as a weapons night sight. In addition, it was part of the equipment fielded in the US Army's Land Warrior program.

The voltage required to power the AN/PVS-14 was 2.7-3.0 volts and 1.2-1.5 volts in newer models. The newer models are devices designed to operate using 1.2-1.5 volts. Conventional implements of the AN/PVS-14 use two AA size batteries (typical of the former version manufactured by ITT Industries) or one AA size battery (typical of the Litton Electro-Optical Systems version). Use of a single AA battery has advantages in terms of ruggedness and having a smaller footprint, yet sacrifices battery life.

It would be beneficial to maintain the small footprint and ruggedness of the single battery version, while increasing battery life. Ideally, this transformation could be performed as a retrofit to existing devices. Further, it would be beneficial from a logistics perspective to be able to maintain use of standardized parts for the AN/PVS-14, such as the commonly available AA size batteries as a viable power source.

BRIEF SUMMARY

The present disclosure provides a solution for an enhanced battery compartment of a night vision monocular device (NVMD) able to support multiple battery types. In the solution, the enhanced battery compartment can permit usage of an AA battery source or a Cylindrical Lithium 123A (CR123A) battery. In one embodiment, the enhanced battery compartment can be coupled to an Army/Navy Personal Viewer System 14 (AN/PVS-14) device. In the embodiment, the enhanced battery compartment can be modularly retrofitted to existing AN/PVS-14 devices enabling current and/or historic AN/PVS-14 devices to be powered with an AA battery or a CR123A battery. Use of the CR123A battery can provide extended operational time over use of the AA battery.

An ability to continue to use the AA sized battery as a power source option (in addition to the CR123A battery) permits cost efficient use during training and short duration maneuvers, reduces complications in logistically supporting the AN/PVS-14—as two options are available; one providing enhanced capability of extended operational time, and adds a degree of flexibility not currently available in conventional implementations.

In one embodiment, two different AN/PVS-14 devices can be joined together via a dual carriage mount. The mount can position the AN/PVS-14 devices so that one is in front of each eye, effectively creating a pair of binoculars from the two AN/PVS-14 devices. In one embodiment, the dual carriage mount can be mounted to a helmet.

One aspect of the disclosure is for a system comprising a night vision monocular device (NVMD) and an enhanced battery compartment mounted to the NVMD device. The NVMD can conform to an Army/Navy Personal Viewer System (AN/PVS) standard. The enhanced battery compartment can accept either a single AA sized battery or a CR123A battery. The NVMD can function regardless of which battery is inserted in the enhanced battery compartment.

One aspect of the disclosure is for an enhanced battery compartment which can include a housing, an interior chamber, a battery door, and positive and negative terminals. The housing can be associated with a night vision monocular device, wherein the night vision monocular device is an Army/Navy Personal Viewer System 14 (AN/PVS-14) device, wherein the housing mounts to the AN/PVS-14 device using four screws. The interior chamber can receive a power source, wherein the power source is either an AA sized battery or a CR123A battery. The enhanced battery compartment can accept both the AA sized battery and the CR123A battery. The battery door can seal the interior chamber of the enhanced battery compartment when the battery door is engaged in a closed configuration. The positive and negative terminals can be electronically coupled to the power source, which are mated to equivalent terminals of the night vision monocular device when the housing is mounted to the AN/PVS-14 device to create a circuit where the AN/PVS-14 device receives power from the power source.

One aspect of the disclosure is for a method for supporting multiple battery types for a night vision monocular device. In the method, an input voltage can be received from a power source within an interior chamber of an enhanced battery compartment associated with a NVMD. The power source can be either an AA sized battery or a CR123A battery. The NVMD can be designed to operate with either battery being inserted into the interior chamber. The NVMD conforms to an Army/Navy Personal Viewer System (AN/PVS) standard. The input voltage can be optionally regulated from the power source to providing an output voltage conforming to a predetermined setting. The regulating of the input voltage can be performed by circuitry in the enhanced battery compartment or by circuitry of the NVMD depending on embodiment. The monocular subassembly associated with the NVMD can be activated (e.g., powered) utilizing the output voltage. Once powered, the monocular subassembly can present a view of an environment within a viewport.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION

Figure 1A:
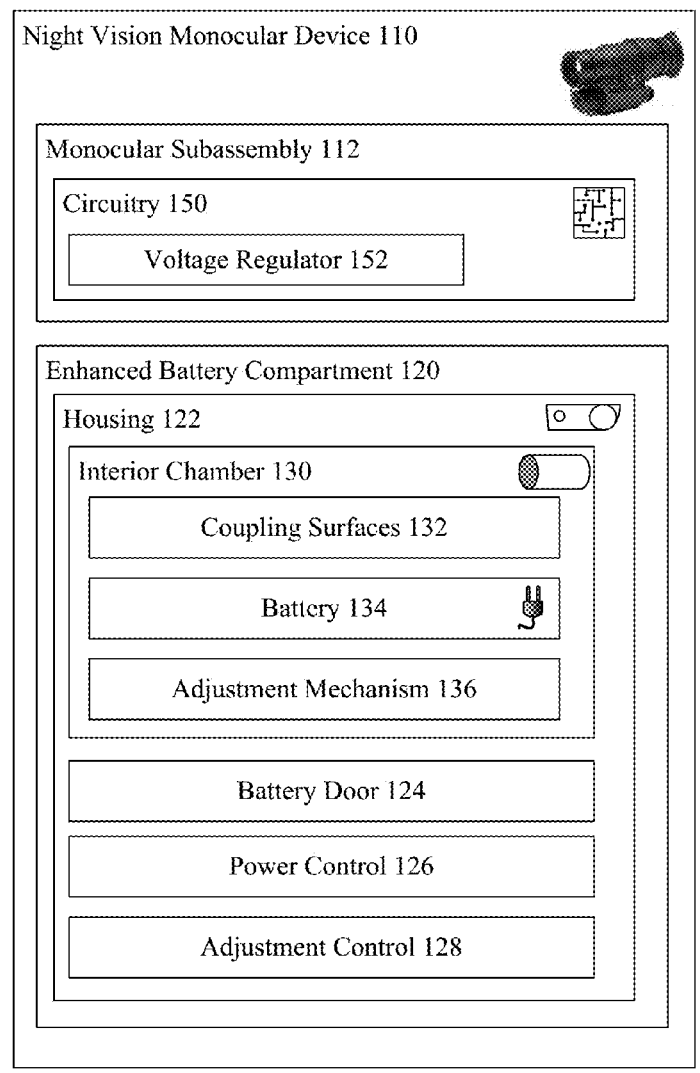
FIG. 1A is a schematic diagram illustrating a system for a night vision monocular device (NVMD) comprising of an enhanced battery compartment able to support multiple battery types.

FIG. 1A is a schematic diagram illustrating a system 100 for a night vision monocular device (NVMD) comprised of an enhanced battery compartment able to support multiple battery types. In system 100, a night vision monocular device (e.g., M914A) 110 can comprise of a monocular subassembly 112 and enhanced battery compartment 120. Monocular subassembly 112 can include, but is not limited to, circuitry 150, objective lens (not shown), monocular housing (not shown), and eyepiece lens (not shown). That is, subassembly 112 can be an electro-optic instrumentation permitting a view of a low light environment (e.g., night vision monocular). Enhanced battery compartment 120 can accept battery 134 which can include an AA battery or a Cylindrical Lithium 123A (CR123A) battery. Circuitry 150 can include, but is not limited to, image intensifier circuitry, power management circuitry, and the like. For instance, circuitry 150 can include a voltage regulator 152 for providing consistent input voltage for monocular subassembly 112 regardless of battery 134 type.

Figure 1B:
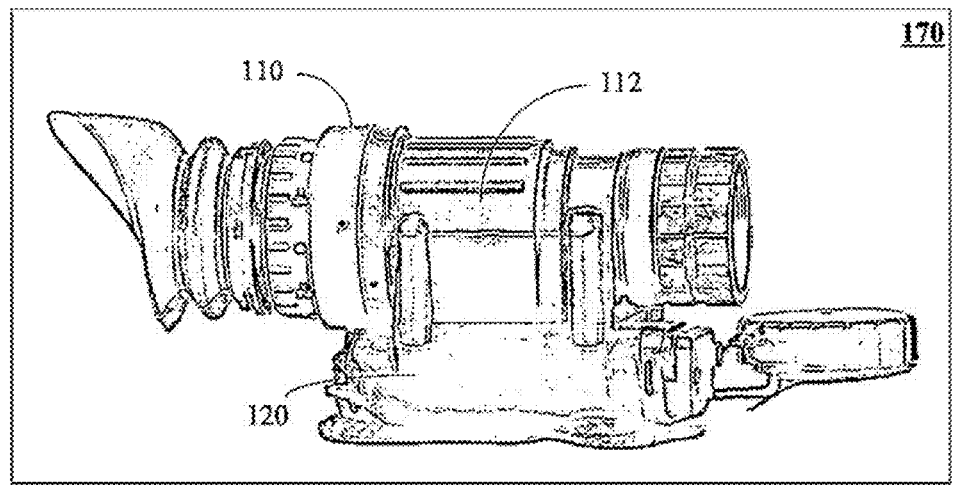
FIG. 1B shows various mountings for the NVMD device.
Figure 1B:
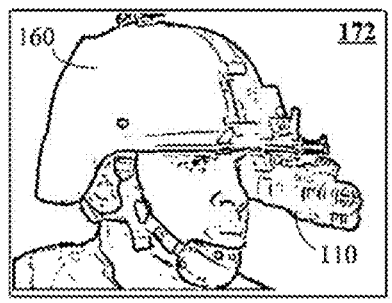
Figure 1B:
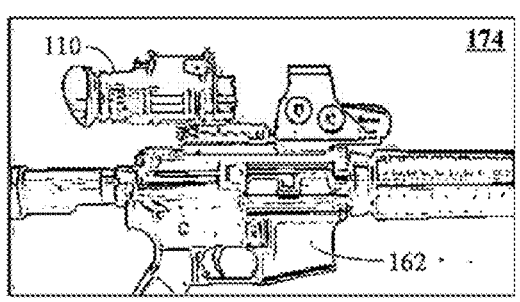
Figure 1B:
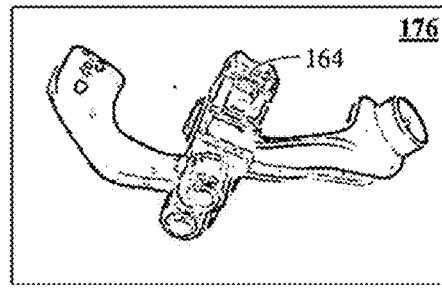
Figure 1B:
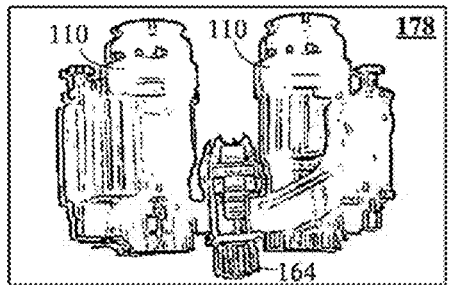
Figure 1C:
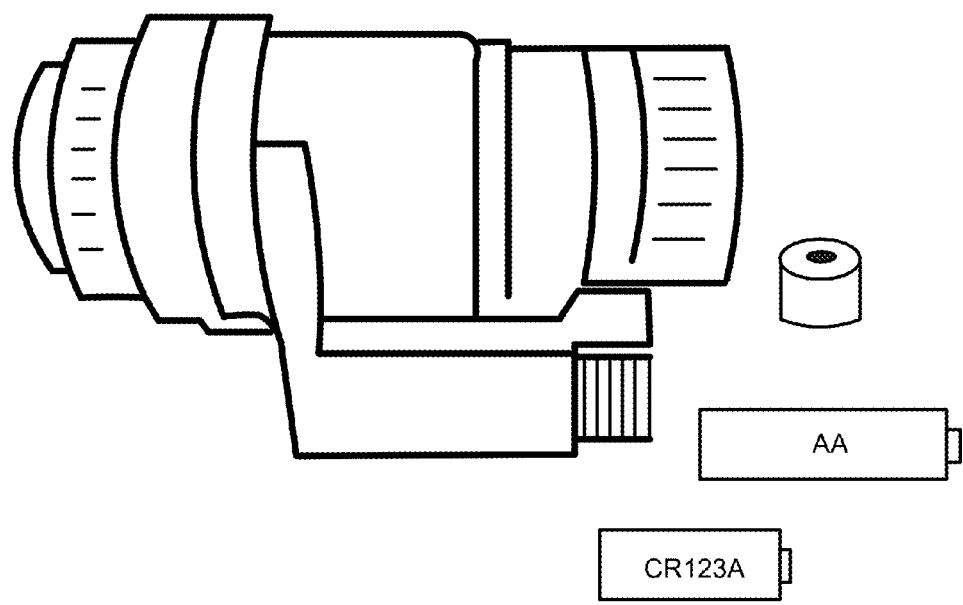
Figure 1D:
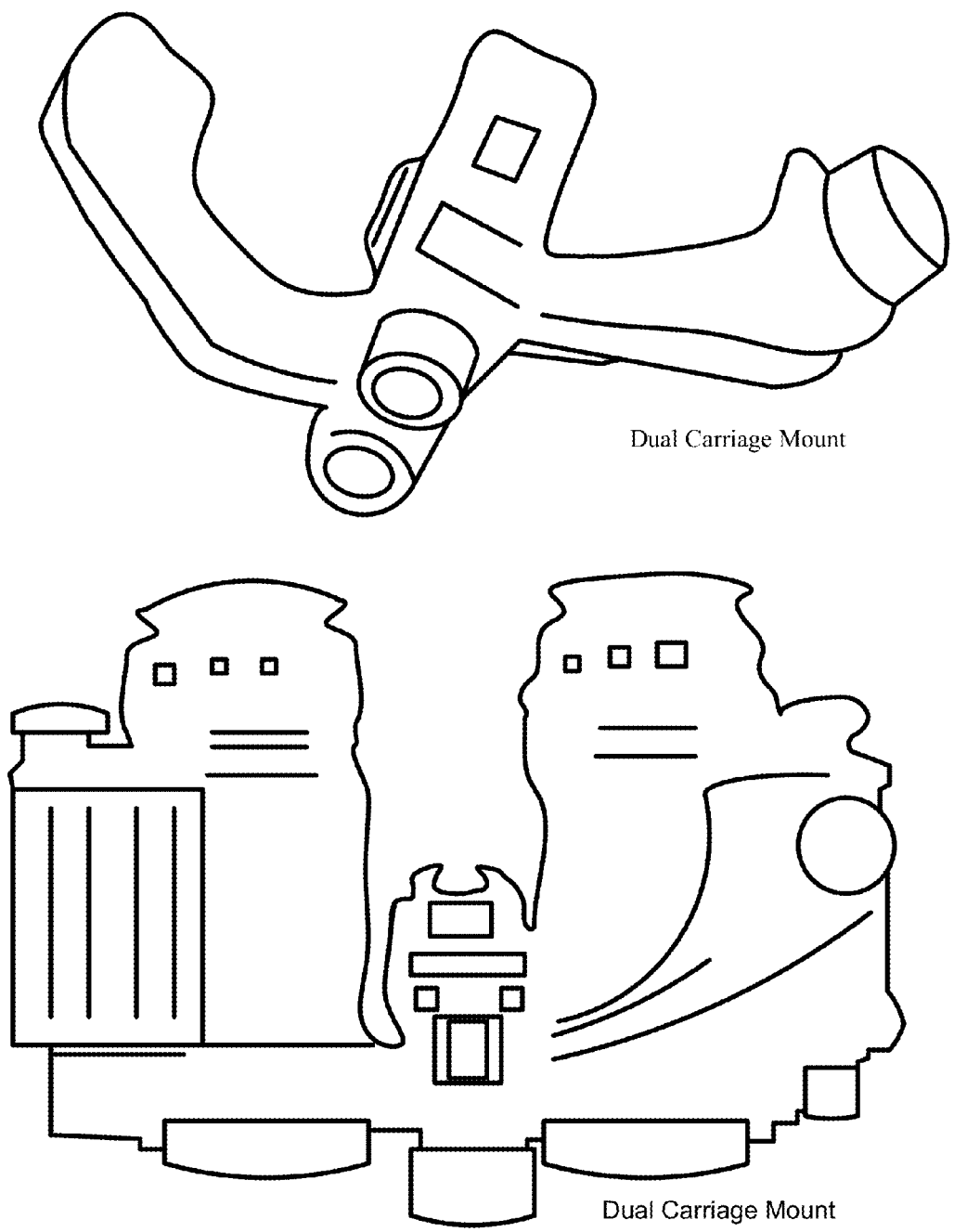

In one embodiment, night vision monocular device 110 can be an Army/Navy Personal Viewer System 14 (AN/PVS-14) device, such as shown in FIG. 1B embodiment 170. In the embodiment, the conventional battery compartment can be retrofitted with an enhanced battery compartment 120 which can permit the AN/PVS-14 to function utilizing an AA battery or a CR123A battery. That is, the enhanced battery compartment can permit improved versatility of the AN/PVS-14 device. It should be appreciated that utilizing a CR123A can result in longer operating times, a larger operating temperature range, and device weight reduction.

Enhanced battery compartment 120 can be a component able to provide compatibility support for multiple battery types for a NVMD 110. Enhanced battery component 120 can conform to traditional battery compartment form factors associated with current generation night vision monocular devices (e.g., AN/PVS-14 Gen 3). That is, enhanced battery compartment 120 can be similar or identical in appearance and/or function to conventional battery compartments of NVMDs. Component 120 can be comprised of, but is not limited to, housing 122, battery door 124, power control 126, and adjustment control 128.

It should be appreciated that an enhanced battery compartment can permit multiple battery types to be used without affecting NVMD performance. That is, attachment mechanism 136 and/or battery door 124 can ensure battery 134 remains unaffected by environmental stresses (e.g., mechanical shock, weather) and operational use. For example, enhanced battery compartment can conform to operational requirements established by military standard (MIL-STD) tolerances.

Housing 122 can encapsulate components 124-136 permitting modular organization of components. Housing 122 can be comprised of, but is not limited to, interior chamber 130, coupling surfaces 132, power source 134, and adjustment mechanism 136. Housing 122 can include one or more conventional materials including, but not limited to, plastics, composite materials, and the like. In one embodiment, voltage regulator 152 can reside within housing 122 of enhanced battery compartment 120.

Interior chamber 130 can be a cavity able to receive an AA battery or a CR123A battery. Chamber 130 can conform to any geometry including, but not limited to, right circular cylinder, hexagonal cylinder, and the like. In one embodiment, chamber 130 configuration (e.g., shape, size) can be modified to accommodate one or more battery 134 types. Chamber 130 can include, but is not limited to, coupling surfaces 132, battery 134, adjustment mechanism 136.

Coupling surfaces 132 can be one or more points of contact which permit power from battery 134 to be conveyed to circuitry 150. Coupling surfaces 132 can include electrically conductive materials oriented to contact battery 134 terminals (e.g., positive/negative terminal). For instance, coupling surfaces can be metal contacts designed to conduct voltage from the battery 134 to circuitry 150. That is, coupling surfaces 132 can include traditional configurations used in current night vision monocular devices.

Battery 134 can be an electro-chemical cell able to provide an electrical supply to monocular subassembly 112. Battery 134 can include, but is not limited to, an AA battery and a CR123A battery. As used herein, AA battery can include American National Standards Institute (ANSI) batteries such as 15A, 15D, 15LF, and the like. CR123A battery can include an ANSI 5018LC battery, CR123, RCR123, and the like.

Adjustment mechanism 136 can be one or more components able to permit different battery 134 types to be securely fitted into chamber 130. Mechanism 136 can include ratcheting components, removable components, interchangeable components, and the like. In one embodiment, mechanism 136 can permit chamber 130 to adapt to battery 134 type based on a user setting. For instance, an adjustment dial can be used to tighten or loosen a ratcheting component associated with the mechanism 136, enabling chamber 130 to change diameter.

Battery door 124 can be a component permitting insertion, containment, and removal of battery 134. Door 124 can enable chamber 130 to be a hermetically sealed when door 124 is engaged. Door 124 can be configured to adapt to battery 134 type utilizing one or more means. In one embodiment, door 124 can be one of multiple doors 124 able to be fitted to chamber 130 based on battery 134 type. In another embodiment, door 124 can be selectively adjusted to compensate for battery 124 type.

When power control 126 is enabled, voltage from battery 134 can be conveyed to voltage regulator 152. Regulator 152 can receive input voltage from battery 134 and produce a pre-determined output voltage to be conveyed to monocular subassembly 112. In one embodiment, output voltage can conform to current generation NVMD power requirements. Regulator 152 can be a component of circuitry 150 or can be independent of circuitry 150. Control 126 can conform to traditional power control mechanisms such as rotating dials, toggle switches, and the like.

Adjustment control 128 can facilitate the operation of adjustment mechanism 136. In one embodiment, control 128 can conform to traditional adjustment control artifacts including, but not limited to, rotating dials, control knobs, push/pull mechanisms, switches, levers, and the like.

Drawings presented herein are for illustrative purposes only and should not be construed to limit the invention in any regard. Although the AN/PVS-14 is presented herein, the present disclosure contemplates derivative NVMDs utilizing an enhanced battery compartment.

It should be appreciated that the monocular device 110 can be used and mounted in various ways. For example, embodiment 172 shows the monocular device 110 mounted to a helmet 160. Embodiment 174 shows the monocular device 110 mounted to a firearm, where it can be used as a scope. Embodiment 176 shows a dual mount 164 that has been originally designed by Nightline, Inc. and allows mounting two night vision monocular in one set to be used as a night vision binocular. This mount 164 originally designed by Nightline, Inc. is shown in use in embodiment 178, where two different devices 110 are attached to the mount 164. The assembly of embodiment 178 can be used as a pair of binoculars. Embodiments 172-178 are presented for illustrative purposes and are not intended to be comprehensive.

The dual mount 176 can be considered a dual carriage system for the M914 night vision monocular (AN/PVS-14 style). Using mount 176, two AN/PVS-14 devices can be concurrently mounted, which results in functional binoculars (embodiment 178). The mount 164 can permit adjustments of the mounting arms so that a relative distance of each monocular to the other can be changed. The mounting arms can be locked, such as through screw attachments as shown, to prevent shifting of the AN/PVS-14 devices once mounted. Thus, the dual mount 164 can adjust for different distances between eyes of different wearers. In one embodiment, the mount 164 can be attachably coupled to headgear, such as helmet 160.

Figure 2:
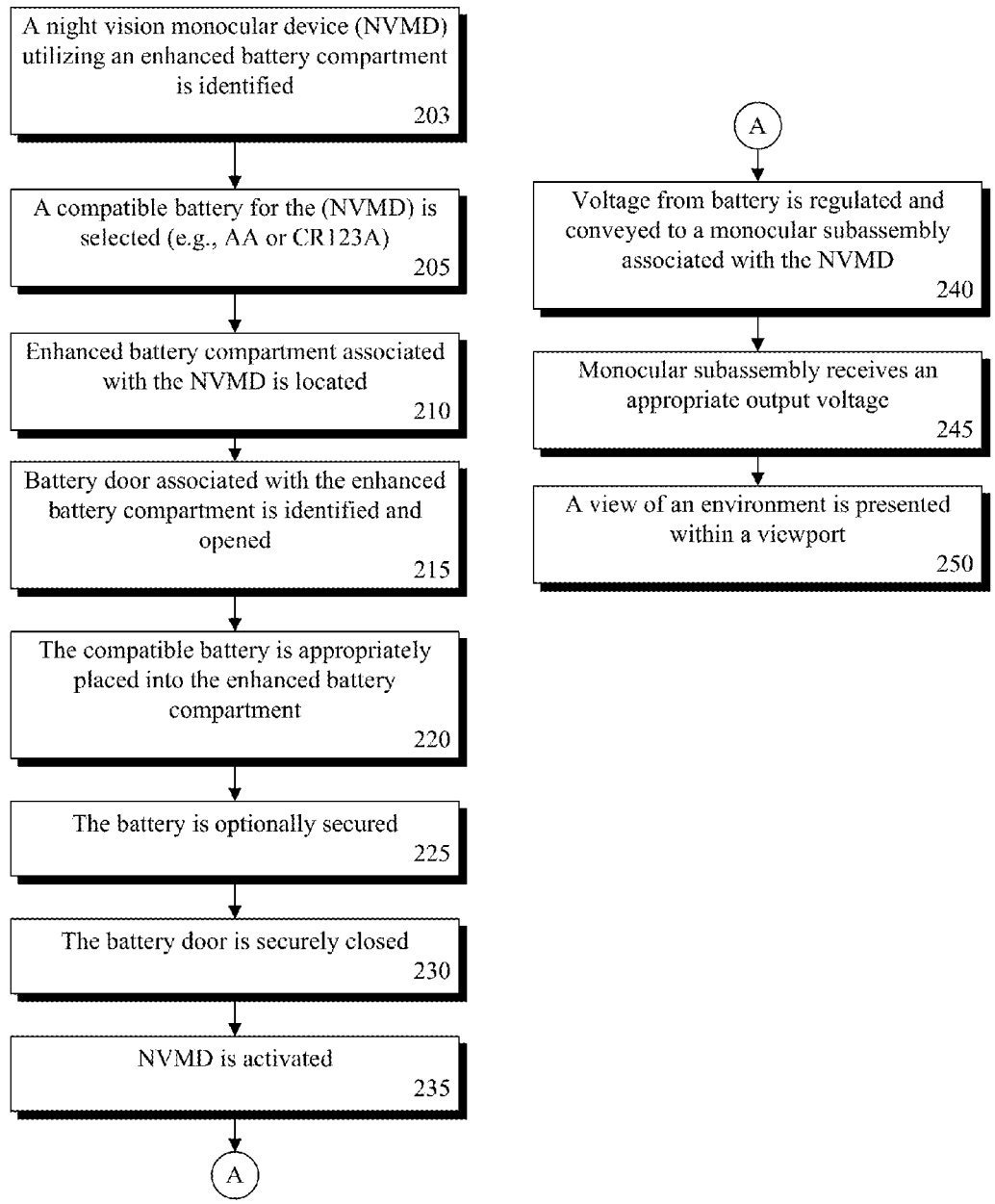
FIG. 2 is a flowchart illustrating a method for inserting a battery into a night vision monocular device equipped with an enhanced battery compartment in accordance with an embodiment of inventive arrangements disclosed herein.

FIG. 2 is a flowchart illustrating a method 200 for inserting a battery into a night vision monocular device (NVMD) equipped with an enhanced battery compartment in accordance with an embodiment of inventive arrangements disclosed herein. Method 200 can be performed in the context of system 100. In method 200, an NVMD can utilize an enhanced battery compartment to support multiple battery types. The NVMD can be a night vision device such as a generation three night vision monocular (e.g., AN/PVS-14).

In step 203, a night vision monocular device utilizing an enhanced battery compartment can be identified. In step 205, a compatible battery for the identified NVMD can be selected. The battery can include an AA battery or a Cylindrical Lithium 123A (CR123A) battery. In step 210, the enhanced battery compartment associated with the NVMD can be located. In step 215, the battery door associated with the enhanced battery compartment can be identified and opened. In step 220, the compatible battery type is appropriately placed into the enhanced battery compartment. In step 225, the battery can be optionally secured. Securing the battery can include manual and/or automatic adjustments enabling the battery to remain stationary within the enhanced battery compartment. In step 230, the battery door can be securely closed. In one embodiment, the battery door can be optionally replaced with a battery door suited for the selected battery type. In step 235, the NVMD can be activated. In step 240, voltage from the battery can be regulated and conveyed to a monocular subassembly associated with the NVMD. In step 245, the monocular subassembly can receive an appropriate output voltage. The output voltage can be a pre-determined voltage range such as 1.2-1.5 Volts. In step 250, a view of an environment can be presented within a viewport associated with monocular subassembly.

Drawings presented herein are for illustrative purposes only and should not be construed to limit the invention in any regard. In one embodiment, steps 205-235 can be performed by a human agent. In an alternative embodiment, steps 205-235 can be performed by a non-human agent (e.g., automated machinery). Steps 235-250 can be enacted via circuitry such as a voltage regulator (e.g., voltage regulator 152).

Figure 3:
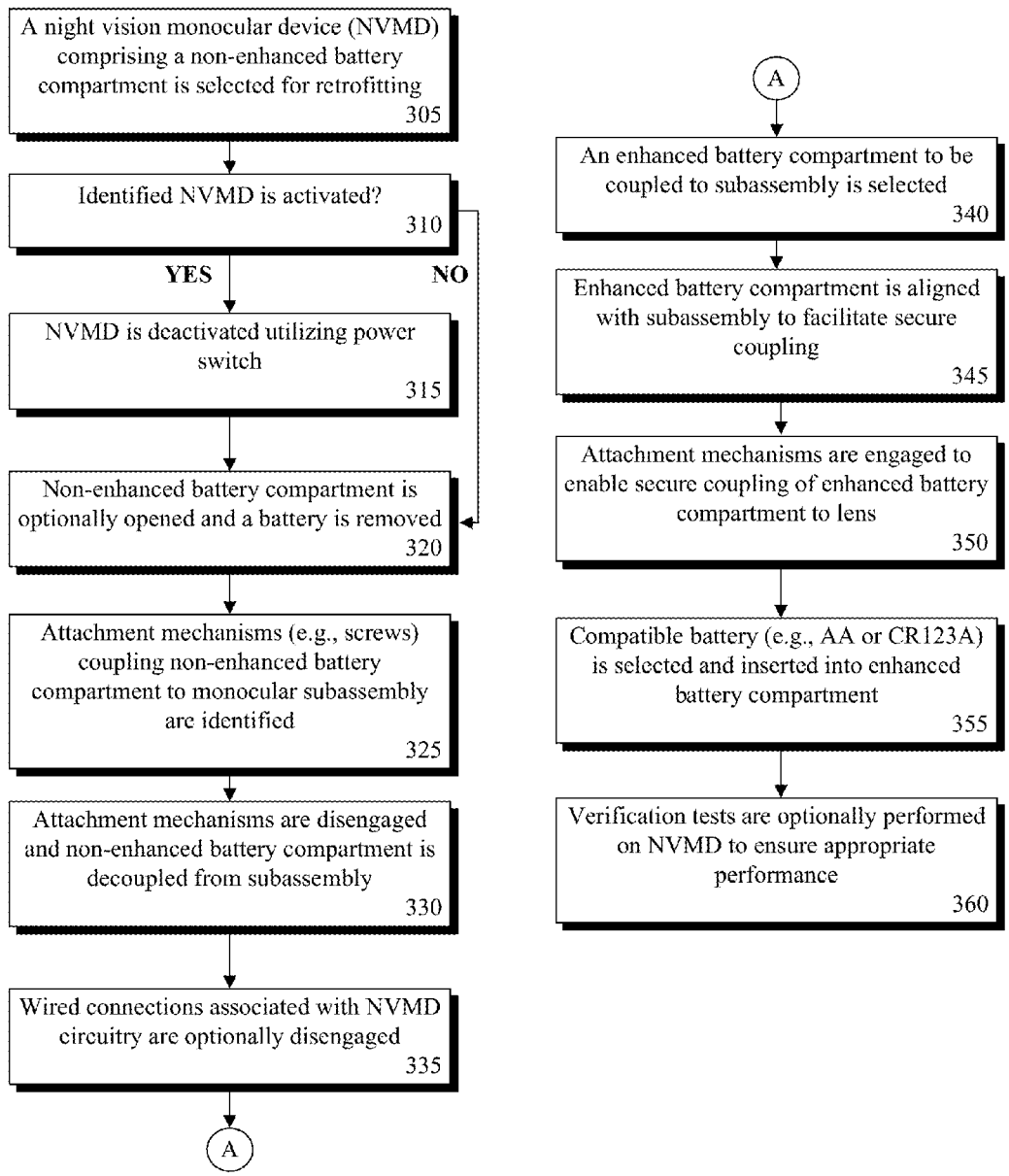
FIG. 3 is a flowchart illustrating a method for retrofitting a night vision monocular device with an enhanced battery compartment in accordance with the embodiment of inventive arrangements disclosed herein.

FIG. 3 is a flowchart illustrating a method 300 for retrofitting a night vision monocular device (NVMD) with an enhanced battery compartment in accordance with the embodiment of inventive arrangements disclosed herein. Method 300 can be performed in the context of system 100. In method 300, a night vision monocular device comprising of a monocular subassembly and a non-enhanced battery compartment can be retrofitted to accommodate multiple battery types.

In step 305, a night vision monocular device comprising of a non-enhanced battery compartment can be selected for retrofitting. In step 310, if the selected NVMD is activated, the method can continue to step 315, else proceed to step 320. In step 315, the NVMD can be deactivated utilizing a power switch associated with the NVMD. In step 320, the non-enhanced battery compartment can be optionally opened and a battery contained in the non-enhanced battery compartment can be removed.

In step 325, attachment mechanisms (e.g., screws) coupling the non-enhanced battery compartment to the monocular subassembly can be identified. The attachment mechanisms can include, but are not limited to, screws, bolt and nuts, brackets, fastening clips, and the like. In one embodiment, attachment mechanisms can be hex drive screws. In step 330, attachment mechanisms can be disengaged and the non-enhanced battery compartment can be decoupled from monocular subassembly. In step 335, wired connections associated with NVMD circuitry can be optionally disengaged. For instance, flexible circuitry connecting the non-enhanced battery compartment and the monocular subassembly can be disconnected enabling complete decoupling of components.

In step 340, an enhanced battery compartment to be coupled to the monocular subassembly can be selected. In step 345, enhanced battery compartment can be aligned with subassembly to facilitate secure coupling. If wired connections were previously disconnected, the wired connections can be reconnected to ensure correct operation of NVMD after retrofitting. In step 350, attachment mechanisms can be engaged to enable secure coupling of enhanced battery compartment. In step 355, a compatible battery type (e.g., AA or CR123A) can be selected and inserted into the enhanced battery compartment. In step 360, verification tests can be optionally performed on the NVMD to ensure appropriate performance and/or operation. Verification tests can include standardized electro-optic tests, military standards (MIL-STD) tests, and the like.

Figure 4:
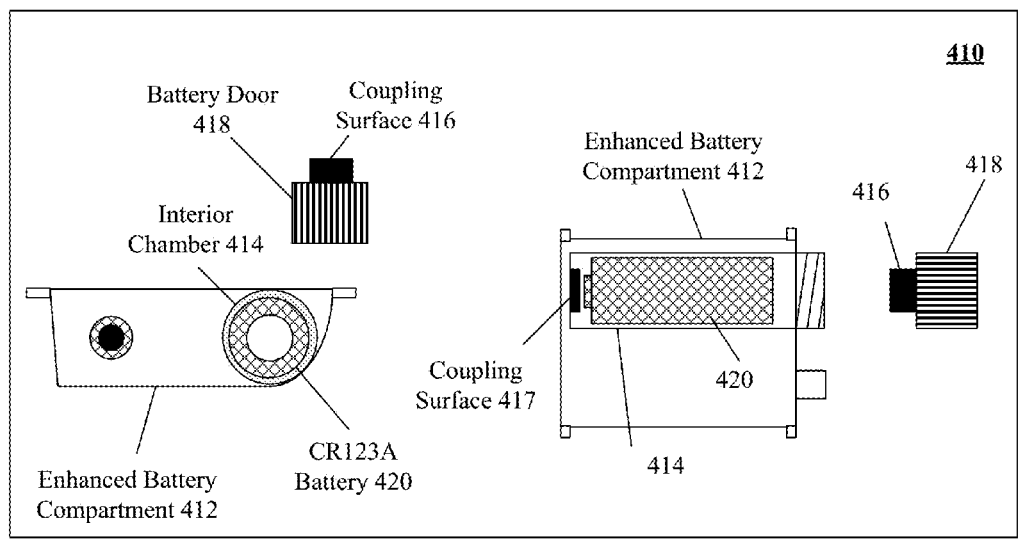
FIG. 4 is a schematic diagram illustrating a set of embodiments for an enhanced battery compartment able to support multiple battery types in accordance with the embodiments of inventive arrangements disclosed herein.
Figure 4:
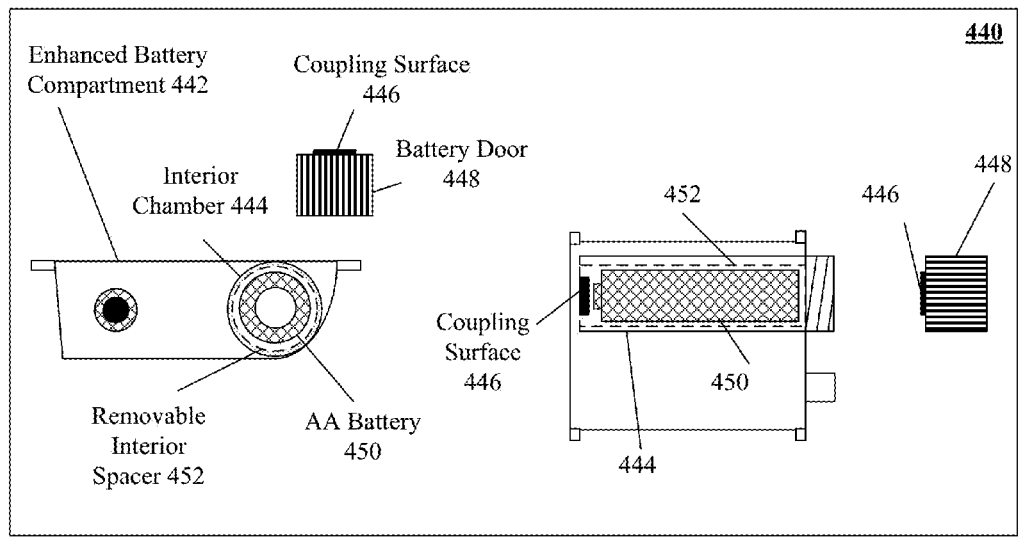

FIG. 4 is a schematic diagram illustrating a set of embodiments 410 for an enhanced battery compartment able to support multiple battery types in accordance with the embodiments of inventive arrangements disclosed herein. In embodiment 410, 440, a side and top view of an enhanced battery compartment 412, 442 are presented. The views of embodiment 410, 440 are for illustrative purposes only and should not be construed to limit the invention in any regard. For clarity, traditional components (e.g., power switch, gain control) have been optionally omitted.

In embodiment 410, an interior chamber 414 and battery door 418 can accommodate a Cylindrical Lithium 123A (CR123A) battery 420. In one configuration of the embodiment, interior chamber 414 dimensions can meet and/or exceed CR123A dimensions. For instance, chamber 414 can exceed seventeen millimeters in diameter and exceed thirty four point five millimeters in height. In one configuration of the embodiment, battery door 418 can include coupling surface 416. In the configuration, coupling surface 416 can protrude from battery door 418 into chamber 414 enabling contact with battery 420 when door 418 is engaged. That is, when the battery door 418 is closed, battery 420 can contact coupling surface 416, 417 securely enabling voltage to be conveyed to appropriate components.

In embodiment 440, a removable interior spacer 452 can be positioned within the interior chamber 444 to facilitate AA battery 450 usage with enhanced battery compartment 442. In one configuration of the embodiment, spacer 452 can reside between chamber 444 and battery 450. In the configuration, spacer 452 can encapsulate the length of the battery 450 permitting battery 450 to friction fit inside chamber 442. That is, once spacer 452 is placed inside chamber 444, spacer 452 can ensure battery 450 movement is restricted. In one configuration, coupling surface 446 which can protrude from battery door 448 into chamber 444 permitting contact with battery 450 when door 448 is engaged.

Embodiments 410, 440 presented herein are for illustrative purposes only and should not be construed to limit the invention. Alternative configurations for embodiments 410, 440 are contemplated. In one embodiment, interior chamber 414, 444 can be modularly interchangeable based on battery 420, 450 type used.

Figure 5:
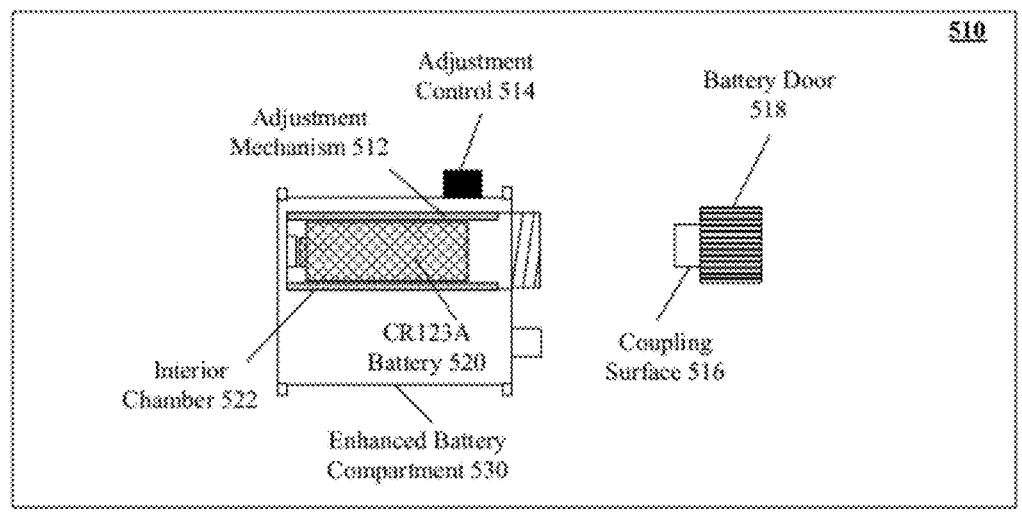
FIG. 5 is a schematic diagram illustrating an embodiment for an enhanced battery compartment able to support multiple battery types in accordance with the embodiments of inventive arrangements disclosed herein.
Figure 5:
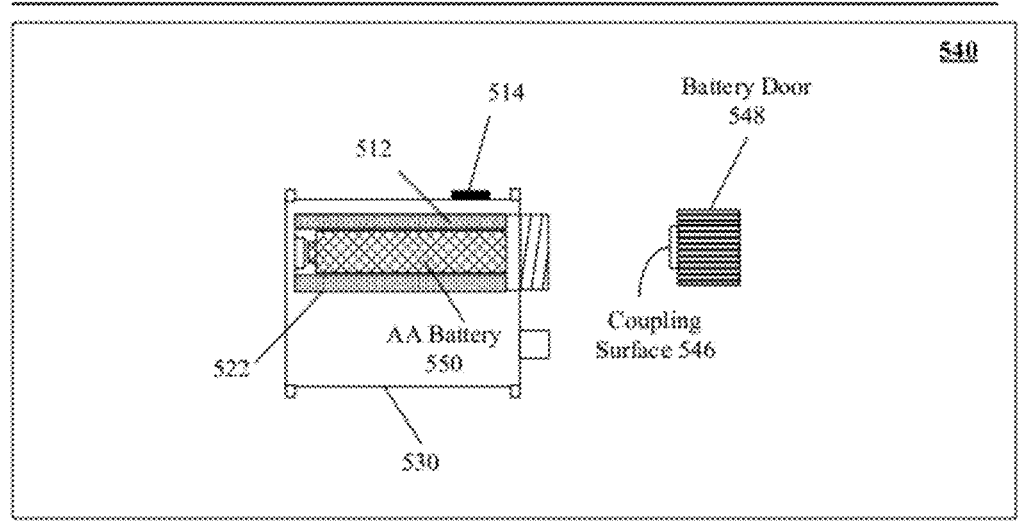

FIG. 5 is a schematic diagram illustrating an embodiment 500 for an enhanced battery compartment able to support multiple battery types in accordance with the embodiments of inventive arrangements disclosed herein. In embodiment 500, a top view of an enhanced battery compartment 530 is presented. The views of embodiment 500 are for illustrative purposes only and should not be construed to limit the invention in any regard. For clarity, traditional components (e.g., power switch, gain control) have been optionally omitted.

In embodiment 500, two configurations 510, 540 can be established utilizing adjustment mechanism 512. Adjustment mechanism 512 can be manipulated using adjustment control 514 to enable enhanced battery compartment 530 to support an AA battery 520 or a CR123A battery 550. In the embodiment 500, adjustment mechanism 512 can be located parallel the interior longitudinal face of the interior chamber 522. In configurations 510, 540 battery door 518, 548 can have varying sizes of coupling surfaces 516, 546 permitting proper fitting of batteries 520, 550.

In the embodiment 500, adjustment mechanism 512 can be selectively modifiable entities. That is, through adjustment control 514 adjustment mechanism can be selectively modified. Adjustment mechanism 512 can include retractable mechanisms, expandable/compressible materials, and the like.

The adjustment control 514 can be a user control such as a rotating dial or slide toggle switch. In embodiment 500, the adjustment control 514 can indicate a degree of adjustment. For example, adjustment control can correspond to a sliding scale (e.g., 1-10) indicating adjustment mechanism 512 setting. In one configuration, adjustment mechanism 514 can have specific settings for each battery type supported permitting rapid configuration of adjustment mechanism.

In embodiment 500, adjustment control 514 can be a dual state user control (e.g., depressible button). For instance, when depressed adjustment mechanism 512 can activate increasing the size of adjustment mechanism 512 and decreasing volume of interior chamber 522. In the embodiment, 500 adjustment mechanism 512 can be decreased to maximize interior chamber 522 volume and increased to increase interior chamber 522 volume.

In one instance, adjustment mechanism 512 can be retrofitted into a non-enhanced battery compartment permitting upgrade paths for historical devices. In another embodiment, adjustment mechanism 512 can be a non-removable component of interior chamber 522. In yet another embodiment, interior chamber 522 can be modularly replaceable permitting multiple chambers to be utilized with enhanced battery compartment 530. That is, interior chamber 522 can be swapped out with an appropriate interior chamber based on a battery selected by an operator.

FIGS. 6-10 show detailed schematics for a battery housing permitting dual use of either AA sized batteries or CR123A batteries. These detailed schematics are for a battery housing for a AN/PVS-14 device, such as device 110 of FIG. 1. The dimensions provided are for one contemplated embodiment. Other embodiments are contemplated where the dimensions and specifics are varied.

Figure 6:
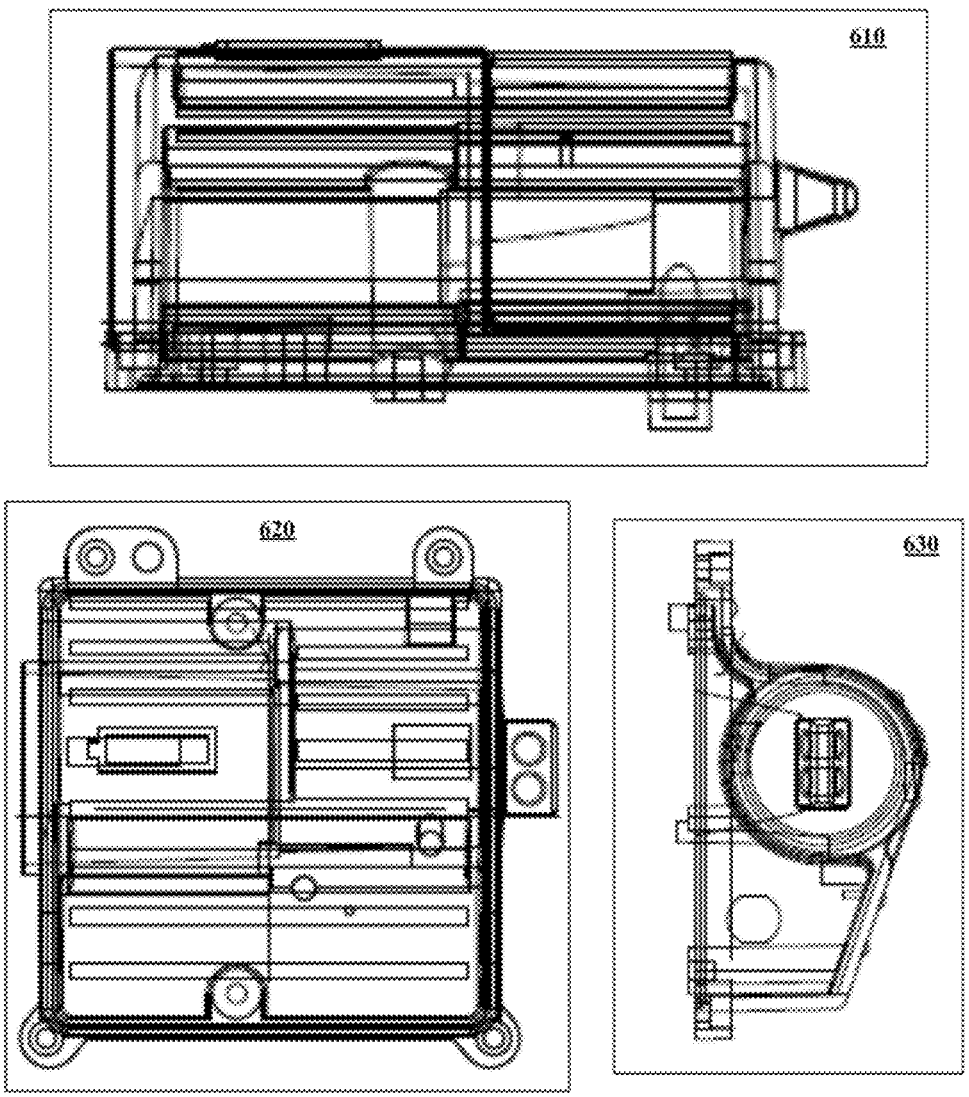
FIG. 6 shows three orthogonal views for a battery housing, which is able to be coupled to a AN/PVS-14 device in accordance with one contemplated embodiment of the invention.

Specifically, FIG. 6 shows three orthogonal views 610, 620, and 630 for a battery housing, which is able to be coupled to a AN/PVS-14 device in accordance with one contemplated embodiment of the invention.

Figure 7:
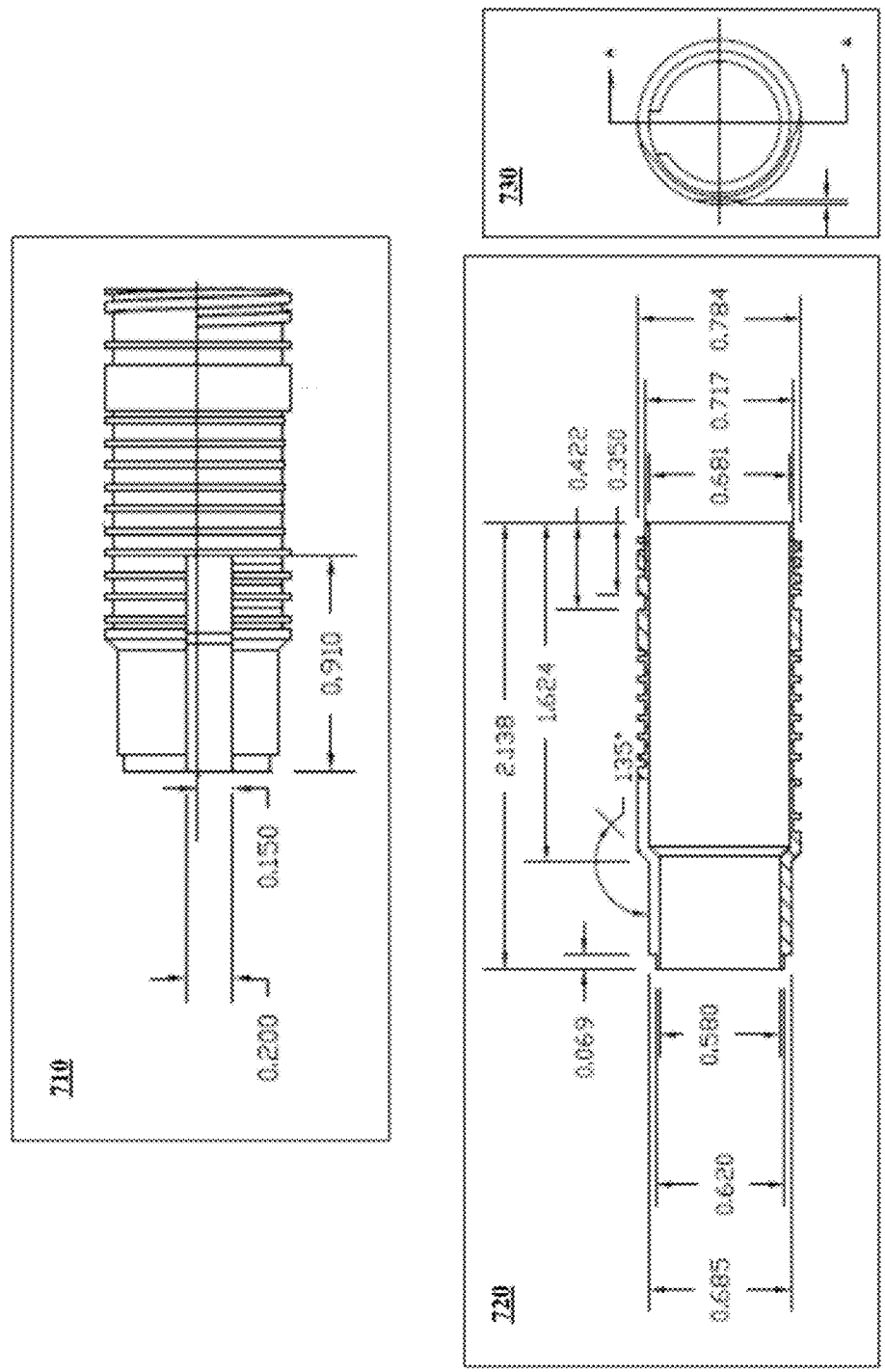
FIG. 7 shows three orthogonal views for a battery sleeve in accordance with an embodiment of the invention.

FIG. 7 shows three orthogonal views 710, 720, 730 for a battery sleeve in accordance with an embodiment of the invention. The threads shown on the sleeve can correspond to those of the battery cap assembly shown in FIG. 9. For example, a 0.02° grinded down region for addition of bus wire (B+) can be used. In one embodiment, the battery sleeve can have a major diameter Max/Min of 0.784/0.780; a minor diameter Max/Min of 0.724/0.710, and a pitch diameter Max/Min of 0.752/0.738. The material of the sleeve can be 360 Brass.

Figure 8:
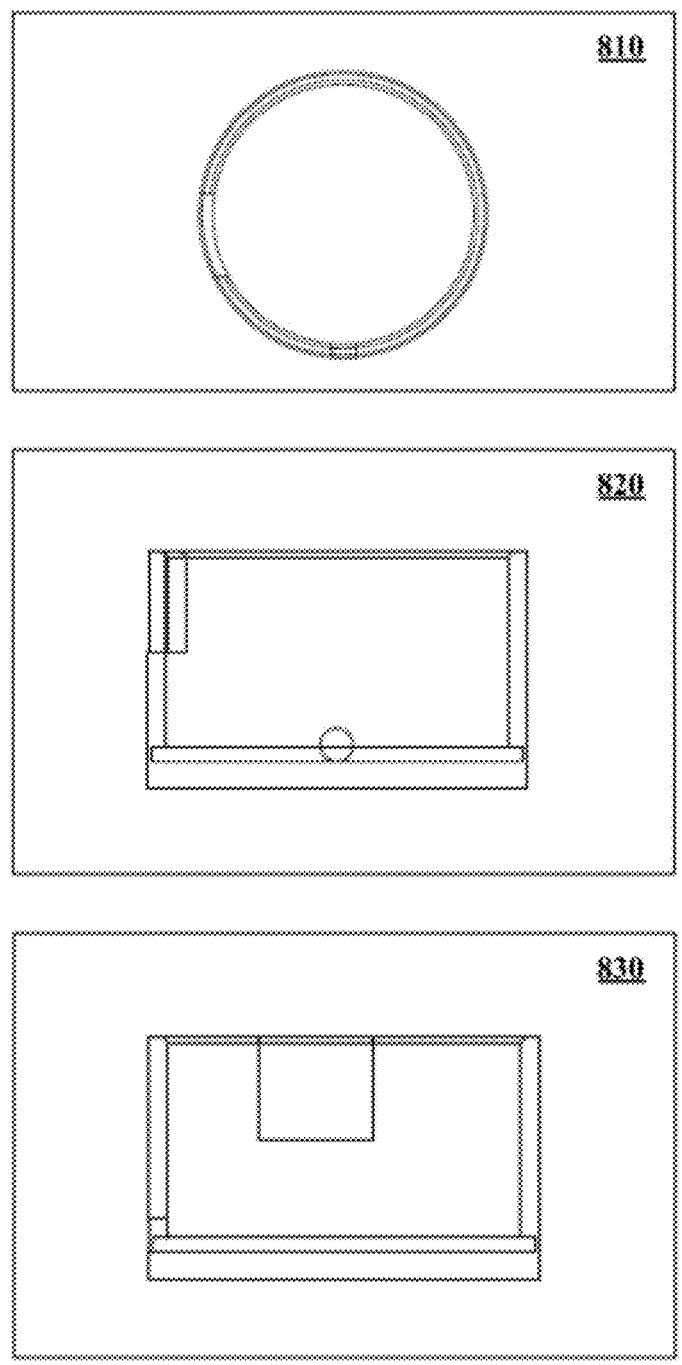
FIG. 8 shows three orthogonal views of an end cap for the battery housing in accordance with an embodiment of the invention.

FIG. 8 shows three orthogonal views 810, 820, 830 of an end cap for the battery housing in accordance with an embodiment of the invention.

Figure 9:
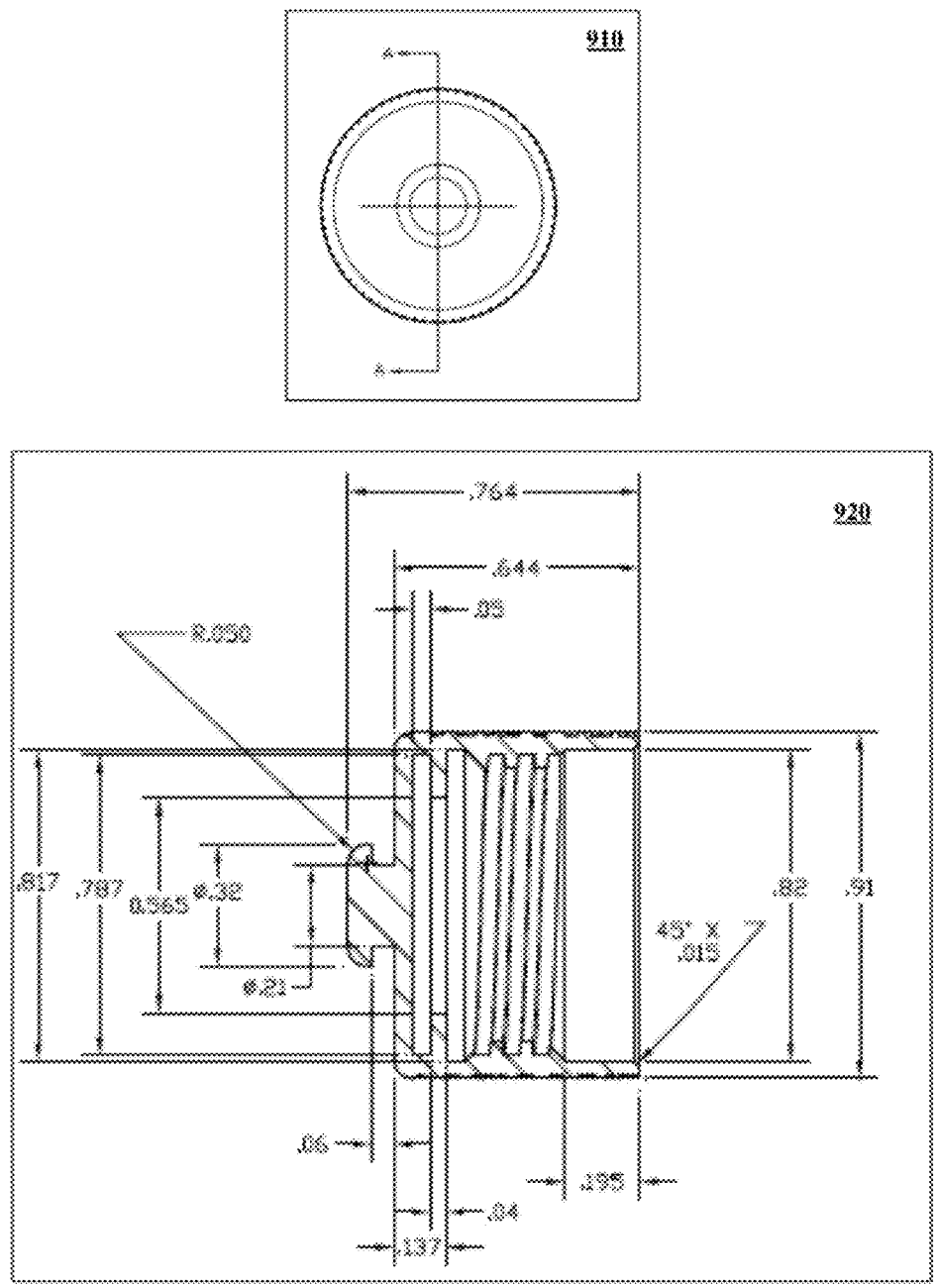
FIG. 9 shows two orthogonal views of a battery cap for the battery housing in accordance with an embodiment of the invention.

FIG. 9 shows two orthogonal views 910, 920 of a battery cap for the battery housing in accordance with an embodiment of the invention. In one embodiment, the battery sleeve can have a major diameter Max/Min of 0.784/0.780; a minor diameter Max/Min of 0.724/0.710, and a pitch diameter Max/Min of 0.752/0.738. The material of the battery cap can be aluminum.

Figure 10:
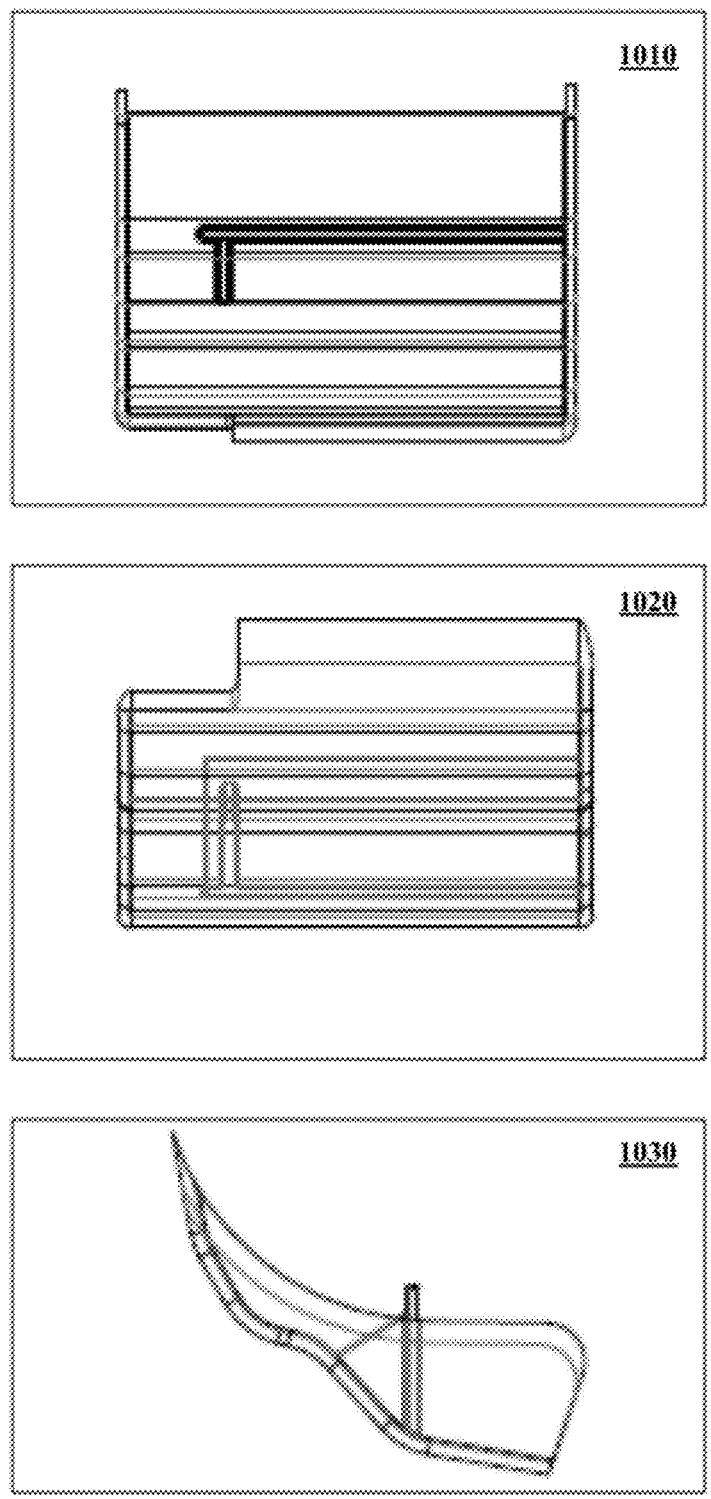
FIG. 10 shows three orthogonal views of a spring cover for the battery housing in accordance with an embodiment of the invention.

FIG. 10 shows three orthogonal views 1010, 1020, 1030 of a spring cover for the battery housing in accordance with an embodiment of the invention.

Drawings presented herein are for illustrative purposes only and should not be construed to limit the invention in any regard. It should be noted that traditional components associated with a battery component of a night vision monocular device have been omitted for clarity.

The diagrams in FIGS. 1-10 illustrate the architecture, functionality, and operation of possible implementations of systems, methods, and products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An enhanced battery compartment comprising:
   a housing of an enhanced battery compartment associated with a night vision monocular device, wherein the night vision monocular device is an Army Navy Personal Viewer System (AN/PVS) device;
   an interior chamber of the enhanced battery compartment configured to receive a power source, wherein the power source is either a AA sized battery or a CR123A battery, wherein the enhanced battery compartment accepts both either the AA sized battery or the CR123A battery without the need of using any other additional adapter, wherein the interior chamber includes a built-in adjustment mechanism having a first state and a second state, wherein said first state fills an interior volume of the interior chamber to correspond to a diameter of the CR123A battery, wherein the second state fills an interior volume of the interior chamber to correspond to a diameter of the AA sized battery, wherein when in the second state, the CR123A has too great a diameter to fit into the interior chamber adjusted for the second state, wherein the CR123A battery fits into the interior chamber adjusted for the first state;
   an adjustment control, which is a user control for changing the adjustment mechanism between the first state and the second state;
   a battery door able to seal the interior chamber of the enhanced battery compartment when the battery door is engaged in a closed configuration, wherein the battery door and its connection to the interior chamber is unaffected by changes in the adjustment control between the first state and the second state;
   positive and negative terminals electronically coupled to the power source, which are mated to equivalent terminals of the night vision monocular device, when the housing is mounted to the AN/PVS device to create a circuit where the AN/PVS device receives power from the power source.

2. The enhanced battery compartment of claim 1, wherein the AN/PVS device is an AN/PVS-14 device, said enhanced battery compartment comprising:
   an adjustment mechanism for securing the power source within the interior chamber enabling the positive terminal of the power source to securely contact the positive terminal of the enhanced battery compartment and enabling the negative terminal of the power source to securely contact the negative terminal of the enhanced battery compartment, wherein the adjustment mechanism adjusts to ensure a snug fit within the enhanced battery compartment of either the AA sized battery or the CR123A battery even though these different types of batteries have different diameters and different longitudinal lengths, wherein the adjustment mechanism utilizes a ratcheting component that changes an interior dimension of the interior chamber by changing a position of an interior member that is parallel to an interior longitudinal face of the interior chamber.

3. The enhanced battery compartment of claim 1, wherein the AN/PVS device is an AN/PVS-14 device, wherein the enhanced battery compartment is a direct replacement for a standard, non-enhanced battery compartment for the AN/PVS-14 device, where the standard, non-enhanced battery compartment only accepts one type of battery, either AA sized or CR123 sized.

4. The enhanced battery compartment of claim 3, wherein the enhanced battery compartment is designed so that the direct replacement of the standard, non-enhanced battery compartment with the enhanced battery compartment requires no changes be made to the AN/PVS-14 device other than the compartment change.

5. The enhanced battery compartment of claim 1, wherein the power source varies in voltage output depending upon which of the AA sized battery or the CR123 battery is used.

6. The enhanced battery compartment of claim 1, wherein the enhanced battery compartment lacks voltage regulation circuitry, wherein the enhanced battery compartment delivers either 1.2-1.5 volts or 2.7-3.0 volts to the AN/PVS device through the positive and negative terminals depending on whether the power source is the AA sized battery or the CR123 battery, wherein the AN/PVS device is designed to operate at two different voltage ranges.

7. The enhanced battery compartment of claim 1, further comprising:
   circuitry associated with the enhanced battery compartment able to regulate an output voltage delivered via the positive and negative terminals, so that regulated power is provided to the AN/PVS device such that the AN/PVS device is effectively unaware of whether the power source is a AA sized battery or a CR123A battery.

8. A system comprising:
a night vision monocular device (NVMD) that conforms to a Army Navy Personal Viewer System (AN/PVS) standard; and
an enhanced battery compartment mounted to the NVMD device, wherein the enhanced battery compartment is able to accept either a single AA sized battery or a CR123A battery, and wherein the NVMD is operable to function regardless of which of the two types of batteries is inserted in the enhanced battery compartment;
said enhanced battery component comprising an interior chamber that includes a built-in adjustment mechanism having a first state and a second state, wherein said first state fills an interior volume of the interior chamber to correspond to a diameter of the CR123A battery, wherein the second state fills an interior volume of the interior chamber to correspond to a diameter of the AA sized battery, wherein when in the second state, the CR123A has too great a diameter to fit into the interior chamber adjusted for the second state, wherein the CR123A battery fits into the interior chamber adjusted for the first state;
an adjustment control, which is a user control for changing the adjustment mechanism between the first state and the second state;
a battery door able to seal the interior chamber of the enhanced battery compartment when the battery door is engaged in a closed configuration, wherein the battery door and its connection to the interior chamber is unaffected by changes in the adjustment control between the first state and the second state.

9. The system of claim 8, wherein the AN/PVS standard is an AN/PVS-14 standard and wherein the NVMD device is a M914 Night Vision Monocular device or other Night Vision Monocular manufactured by other companies based on the AN/PVS-14 standard.

10. The system of claim 8, wherein the enhanced battery compartment further comprises:
a housing that mounts to the NVMD device using four screws;
an interior chamber of the enhanced battery compartment configured to receive a power source, wherein the power source either of a AA sized battery and a CR123A battery, wherein the enhanced battery compartment accepts both the AA sized battery and the CR123A battery; and
positive and negative terminals electronically coupled to the power source, which are mated to equivalent terminals of the night vision monocular device, when the housing is mounted to the NVMD device to create a circuit where the NVMD device receives power from the power source.

11. The system of claim 10, wherein the enhanced battery compartment lacks voltage regulation circuitry, wherein the enhanced battery compartment delivers either 1.2-1.5 volts or 2.7-3.0 volts to the NVMD device through the positive and negative terminals depending on whether the power source is the AA sized battery or the CR123 battery, wherein the NVMD device is designed to operate at two different voltage ranges.

12. The system of claim 10, further comprising:
circuitry associated with the enhanced battery compartment able to regulate an output voltage delivered via the positive and negative terminals, so that regulated power is provided to the NVMD device such that the NVMD device is effectively unaware of whether the power source is a AA sized battery or a CR123A battery.

13. The system of claim 8, further comprising:
a dual carriage mount for mounting two different night vision monocular devices, each being configured identically to said night vision monocular device, wherein in a post mounting stage, the two different night vision monocular devices and the dual carriage mount form a single pair of binoculars.

14. A method for supporting multiple battery types for a night vision monocular device comprising:
receiving an input voltage from a power source within an interior chamber of an enhanced battery compartment associated with a night vision monocular device (NVMD), wherein the power source is either of at least one AA sized battery and a CR123A battery, wherein the night vision monocular device is designed to operate with either battery being inserted into the interior chamber, wherein the NVMD conforms to a Army Navy Personal Viewer System (AN/PVS) standard, said interior chamber of the an interior chamber of the enhanced battery compartment configured to receive a power source, wherein the power source is either a AA sized battery or a CR123A battery, wherein the enhanced battery compartment accepts both either the AA sized battery or the CR123A battery without the need of using any other additional adapter, wherein the interior chamber includes a built-in adjustment mechanism having a first state and a second state, wherein said first state fills an interior volume of the interior chamber to correspond to a diameter of the CR123A battery, wherein the second state fills an interior volume of the interior chamber to correspond to a diameter of the AA sized battery, wherein when in the second state, the CR123A has too great a diameter to fit into the interior chamber adjusted for the second state, wherein the CR123A battery fits into the interior chamber adjusted for the first state, wherein the night vision monocular device also includes an adjustment control, which is a user control for changing the adjustment mechanism between the first state and the second state, wherein a battery door of the night vision monocular device is able to seal the interior chamber of the enhanced battery compartment when the battery door is engaged in a closed configuration, wherein the battery door and its connection to the interior chamber is unaffected by changes in the adjustment control between the first state and the second state;
receiving an adjustment of the adjustment mechanism from the first state to the second state;
responsive to the adjustment, adjusting the interior diameter of the interior chamber to the second state from the first state;
regulating the input voltage from the power source and providing an output voltage conforming to a pre-determined setting, wherein regulating the input voltage is performed by an entity external to the enhanced battery compartment; and
activating a monocular subassembly associated with the NVMD utilizing the output voltage, wherein the monocular subassembly presents a view of an environment within a viewport.

15. The method of claim 14, further comprising:
identifying a legacy night vision monocular device (NVMD) to be retrofitted with an enhanced battery compartment, wherein the legacy NVMD comprises of a non-enhanced battery compartment and a monocular subassembly, wherein the non-enhanced battery compartment is configured to operate only on one or more AA sized batteries, wherein the enhanced battery compartment is configured receive at least one of an AA battery and CR123A battery;

disengaging attachment mechanisms associated with the legacy NVMD, wherein the attachment mechanisms affixes the non-enhanced battery compartment to the monocular subassembly of the legacy NVMD;

replacing the non-enhanced battery compartment with the enhanced battery compartment, wherein thereafter, the night vision monocular device with the enhanced battery compartment is operable to use either of the at least one AA sized battery and the CR123A battery.

16. The method of claim 15, wherein the replacing consists of mechanically screwing the enhanced battery compartment to the night vision monocular device while not making any other change to the night vision monocular device, yet responsive to the replacing enabling functionality for use of either the at least one AA sized battery and the CR 123A battery.

17. The method of claim 15, wherein the replacing further comprises:

orienting the enhanced battery compartment to the monocular subassembly of the NVMD, wherein the orienting results in the appropriate mating of the enhanced battery compartment with the monocular subassembly;

engaging the attachment mechanisms associated with the NVMD, wherein the attachment mechanisms couples the enhanced battery compartment to the monocular subassembly; and optionally testing the functionality of the NVMD to determine the NVMD performs within pre-specified tolerances, wherein the pre-specified tolerances are operating standards for a NVMD.

18. The method of claim 14, wherein the method is performed as a value-added service by a human agent before a sale of the NVMD device to a consumer occurs.

19. The method of claim 14, wherein the method is performed as a service for a fee by a human agent after an original sale of the NVMD device to an original consumer occurs, wherein the original sale is for the NVMD device with a non-enhanced battery compartment, wherein the non-enhanced battery compartment only accepts one or more AA size batteries and does not accept the CR123A battery, wherein as part of the service, the non-enhanced battery compartment is replaced by the enhanced battery compartment.

20. The method of claim 14, wherein the NVMD device is designed to operate at two different voltage ranges per the (AN/PVS) standard, wherein one of the two voltage ranges is between 1.2 and 1.5 volts, wherein the other of the two voltage ranges is between 2.7 and 3.0 volts.

* * * * *